US006168521B1

(12) United States Patent
Luciano et al.

(10) Patent No.: US 6,168,521 B1
(45) Date of Patent: Jan. 2, 2001

(54) VIDEO LOTTERY GAME

(76) Inventors: Robert A. Luciano, 4665 Lakewood Ct., Reno, NV (US) 89509; Art Bunce, P.O. Box 2516, Escondido, CA (US) 92033; Glenn M. Feldman, 9855 N. 49th Pl., Paradise Valley, AZ (US) 85253; George Forman, 5055 Lucas Valley Rd., Nicasio, CA (US) 94946; Jerome Levine, 4741 Arcola Ave., N. Hollywood, CA (US) 91602

( * ) Notice: Under 35 U.S.C. 154(b), the term of this patent shall be extended for 0 days.

(21) Appl. No.: 08/928,297

(22) Filed: Sep. 12, 1997

(51) Int. Cl.[7] ...................................................... A63F 13/00
(52) U.S. Cl. ................................ 463/18; 463/17; 463/29; 463/42
(58) Field of Search ................................ 463/16, 17, 18, 463/29, 42

(56) References Cited

U.S. PATENT DOCUMENTS

| | | | | |
|---|---|---|---|---|
| 4,467,424 | | 8/1984 | Hedges et al. . | |
| 4,494,197 | * | 1/1985 | Troy et al. | 463/18 |
| 4,652,998 | | 3/1987 | Koza et al. . | |
| 4,689,742 | | 8/1987 | Troy et al. . | |
| 4,842,278 | * | 6/1989 | Markowicz | 463/18 |
| 5,042,809 | | 8/1991 | Richardson . | |
| 5,265,874 | | 11/1993 | Dickinson et al. . | |
| 5,276,312 | | 1/1994 | McCarthy . | |
| 5,324,035 | | 6/1994 | Morris et al. . | |
| 5,326,104 | | 7/1994 | Pease et al. . | |
| 5,380,007 | * | 1/1995 | Travis et al. | 463/22 |
| 5,398,932 | * | 3/1995 | Eberhardt et al. | 463/17 |
| 5,417,424 | * | 5/1995 | Snowden et al. | 463/18 |
| 5,429,361 | | 7/1995 | Raven et al. . | |
| 5,505,449 | | 4/1996 | Eberhardt et al. . | |
| 5,605,504 | * | 2/1997 | Huang | 463/18 |
| 5,639,088 | | 6/1997 | Schneider et al. . | |
| 5,674,128 | * | 10/1997 | Holch et al. | 463/18 |
| 5,709,603 | | 1/1998 | Kaye . | |
| 5,722,890 | * | 3/1998 | Libby et al. | 463/17 |
| 5,779,545 | | 7/1998 | Berg et al. . | |
| 5,810,664 | | 9/1998 | Clapper, Jr. . | |
| 5,830,063 | * | 11/1998 | Byrne | 463/18 |

* cited by examiner

*Primary Examiner*—Valencia Martin-Wallace

(57) ABSTRACT

This invention is directed to an electronic lottery game system utilizing multiple player-activated video terminals that are linked to computers performing centralized game draw and accounting functions. Each player places a wager and selects his lottery draw choices. The system enrolls the player in a future lottery game after the player makes his choices. The system automatically draws the lottery numbers. The result of the selected game is displayed at the player's terminal in such a manner as to provide the excitement of a real time game.

22 Claims, 8 Drawing Sheets

VIDEO LOTTERY GAME

BACKGROUND OF THE INVENTION

The present invention pertains to lottery type games, in general, and to electronic lottery games, in particular.

Slot machines have become increasingly popular with players in many legalized gaming establishments. In some jurisdictions, however, legal restrictions on gaming machines have made it impossible to put traditional type slot machines into play in certain gaming facilities. Those jurisdictions however will permit lottery terminals to be used by players to participate in lottery draws.

In these jurisdictions, it is desirable to provide devices that have the excitement of electronic gaming machines while adhering to lottery principles. Such a game would add to the excitement and fun that a player may experience in legalized gaming establishments that are subject to prohibitions on the use of traditional slot machines. Such games would have the additional advantage of being acceptable in certain jurisdictions such as California.

SUMMARY OF THE INVENTION

In accordance with the principles of the invention, an electronic gaming system is provided which is an electronic lottery system but which may be played at video lottery terminals in a manner which provides more excitement and entertainment than is ordinarily available while playing a lottery.

In accordance with the principles of the invention, an electronic lottery gaming system provides for the independent operation of lottery draws and replays of lottery draws for a player in an entertaining fashion. A player may purchase one or more chances in a future lottery draw via an electronic gaming terminal or a video lottery terminal. The player receives an electronic or physical ticket that represents the chance that the player purchased in the future draw before the draw occurs. This allows a player to procure a chance in a draw that is received before valuation of that chance is changed by the draw process.

In one embodiment of a system in accordance with the principles of the invention, the lottery draw or random selection process operates completely independent of all other inputs, activities and processes that may occur in other portions of the gaming system.

Further, in accordance with one aspect of the invention, the system provides for display of the lottery draws as they occur to allow the player after the draw to view the outcome of each draw and assess the value of the chance. In one embodiment of the invention, the display of the draws occurs on remote displays. A system in accordance with the invention provides for the player to enter the chance in electronic form, printed ticket form or other tangible forms at an electronic or video lottery terminal and to view the results of the purchased chance. The player is provided with an entertaining electronic display associated with the results of the purchased chance. The player is then offered the opportunity to continue to view the previously purchased chances, purchase chances in future lottery draws, or redeem the value after the draw occurs.

Still further in accordance with the principles of the invention, the gaming system provides for the playback of randomly selected game outcomes which are selected from a group of game outcomes corresponding to the results of the player's draw selections.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
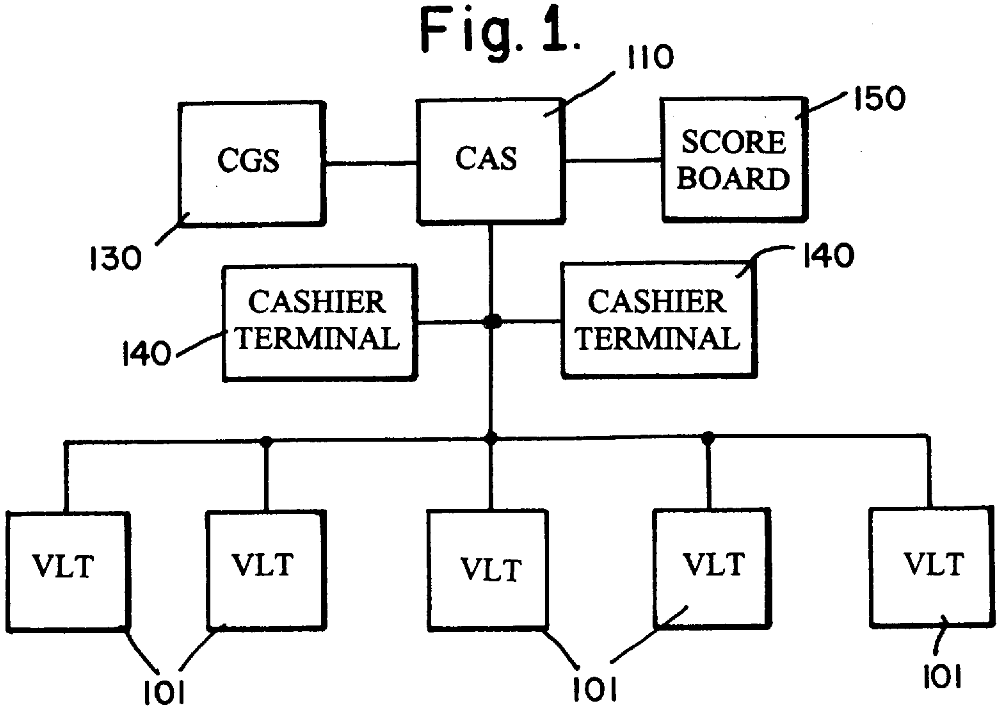
FIG. 1 illustrates a system in accordance with the invention in block diagram form.

The present invention is an electronic system for playing a lottery game on an electronic machine that provides a player more excitement and entertainment than is ordinarily available while playing a traditional lottery game. The illustrative embodiment shown and described herein is particularly well suited to comply with California gaming requirements.

To play electronic lottery games in accordance with the invention, the player inserts or transfers currency or other representation of value into a video lottery terminal. The player selects the number of games to be played and the amount to be wagered on each game. For each game, the player selects his/her choices by touching a touch screen on a display of the video lottery terminal or by requesting the system to make the selection for him by means of an automatic selection option comparable to the "quick pick" selection option of various lottery games. In the embodiment of the invention described herein, a touch screen display is utilized. In other applications, there may be player buttons for some or all of the touch screen functions.

The player's choices are communicated to a computer referred to as a central accounting server which manages operation of the gaming system for the lottery draws, and which enrolls the player's choices in the next available or some future lottery game draw. The player's choices are recorded. The recording is an electronic record that is associated with a, game play. For application in California, the player is provided with game play ticket which is a printed or electronically encoded ticket which is tangible and which identifies the number of games played as well as the player choices, game identifier, amount of wager, date and time of enrollment and an identifier for the particular video lottery terminal at which the player entered his choices. The game play ticket may be used as a bearer instrument for verification and redemption of winnings. Thus, in jurisdictions which require a physical ticket, the physical game play ticket may be ejected from the video lottery terminal prior to the lottery draw for each game and prior to display of the enrolled game on one or more scoreboards.

Operating independently of the video lottery terminals and the central accounting server is a central game server which automatically completes a new lottery game by drawing the numbers, symbols or other outcomes for the game. In the illustrative embodiment of the invention, the central game server periodically completes new lottery games on an automatic basis. In other embodiments of the invention which may be utilized in non-California applications, rather than periodically initiating new games, the central game server may initiate new lottery games based upon player demand.

The lottery draw for each game occurs automatically whether initiated on a periodic basis as in the illustrative embodiment or on demand in other embodiments. In the illustrative embodiment of the invention, which is particularly adapted to California games, the central game server is a separate computer from the central accounting server. However, in other embodiments which are not required to meet California gaming requirements, the function of the central game server and the functions of the central accounting server may reside in a single computer. In this instance, the functions would be separate and independent but the hardware would be common to the functions.

In the illustrative embodiment, the lottery draw is displayed on one or more scoreboards. The player may view the draws for lottery games on the scoreboards to determine whether the player has a winning play ticket. In other embodiments of the invention the video lottery terminal may provide the player with the ability to verify the draw. In other embodiments of the invention, which are not intended to be used in California, there may be no scoreboard display, but the player could request results of a specific game at a video lottery terminal. In the illustrative embodiment of the invention, only after the display of the lottery draw can the video lottery terminal be activated to display the game results. At any time after a lottery game, the player may verify the game result. For instances in which the player receives a game play ticket, the player may verify by inserting the game play ticket into any available video lottery terminal or by handing it to a cashier for verification. In alternate embodiments of the invention which use an electronic record of the player's choices, the player may initiate verification from a video lottery terminal. In either instance, the player's ticket, whether electronic or not, may include several games and the player may verify and automatically replay games that the player enrolled with on that ticket. The player may initiate replay at his/her own pace. In some embodiments of the invention, the player may only replay a subset of the games, such as only winning games.

A player may "cash out" player credits in one or more ways. The player may request and receive a redemption ticket from the video lottery terminal and present it to a cashier or by presenting the game ticket to a cashier. In this case, the ticket is entered at a cashier terminal which is in communication with a central accounting server or system to verify the player credit balance and the player is then paid by the cashier. In other arrangements, a redemption terminal may be provided from which the player could collect winnings with an attendant cashier. In other embodiments of the invention, and in non-California embodiments in particular, there may be currency payouts directly at the video lottery terminals, debit or credit account based transfers, or various forms of tokens or coupons.

A system in accordance with the invention will accommodate multiple types of game play. In one type of game play, each game may have one or more prize levels. Each prize level is associated with a prize for which the amount or method of computation is announced in advance of each lottery draw. In each lottery game, a player is eligible to win a prize. In one embodiment of the invention, particularly suited for California, the prizes distributed in connection with a prize level are distributed from and solely funded by wagers which have been allocated to a pool associated with that prize level. In other embodiments, an initial seed fund may be used to provide a return for players at the start up of a game. In the illustrative embodiment there is one regular prize pool for each prize level and a reserve pool for each prize level. The reserve pool is used to replenish its associated regular prize pool should that pool become depleted or to supplement bonus or jackpot prizes for that or a higher prize level. When a wager is collected from a player, the wager is recorded by the central accounting system which deducts an administrative fee and allocates the balance to the wager among one or more prize pools for that game. Undistributed prizes in any prize pool following a game draw are carried forward to future game draws.

In another game, which includes an "instant" lottery feature, the draw is a random selection of chances from a predetermined pool of prize values or game outcomes.

Figure 2:
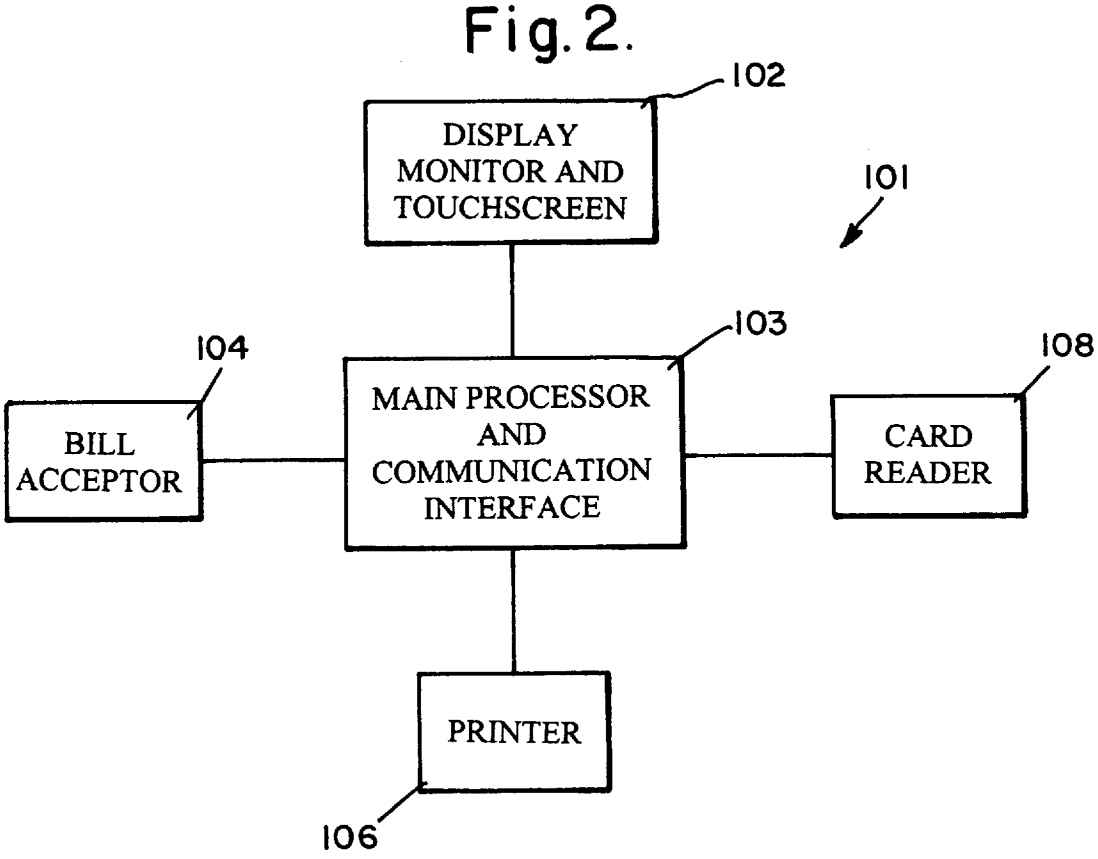
FIG. 2 is a more detailed block diagram of a portion of the system of FIG. 1.

Turning now to FIG. 1 a block diagram of a gaming system in accordance with the invention is shown. The system includes a plurality of video lottery terminals 101 coupled to a central computer referred to as the central accounting server 110. The central accounting server also is coupled to cashier terminals 140, a scoreboard 150 and a lottery computer or central game server 130. Turning to FIG. 2, a video lottery terminal 101 is shown in greater detail. The terminal 101 includes a display monitor and touch screen 102. The display monitor and touch screen 102 may be of a type which is commercially available. The terminal 101 includes a processor and a communications interface 103. The processor portion of the processor and communications interface 103 may be a commercially available unit having associated therewith various memories and a communications interface. The communications interface portion is used to permit the processor portion to communicate to the central accounting server 110 and to peripheral devices or elements. Other peripheral devices or elements include a bill and/or coin acceptor 104 which may be of a type commercially available and a printer 106 which also may be a commercially available type. In other embodiments of the invention, printer 106 may be substituted for coin, token or currency accepter 104 or both may be used. The printer 106 is used to dispense a game play ticket and/or redemption ticket. The card reader 108 is one which can receive and utilize a game play ticket or card. The game play ticket reader 108 is a commercially available unit such as the ones utilized in ATM machines to read an ATM card, "smart" card or other card utilized for the credit and debit of money. The reader may be a magnetic stripe card reader that is motorized or non-motorized, a ticket reader with optical or magnetic sensors or other card or ticket reader.

In operation of the system of FIG. 1, if a game play ticket is inserted into a card reader 108 before completion of all games enrolled on the ticket, the game play ticket will be automatically ejected from the card reader without displaying any game results. It should be noted that in other embodiments of the invention, the game play ticket may not be so ejected. The video lottery terminals 101 partially eject game play tickets immediately after a player enrolls in a game as described below to allow the player to remove the ticket, if desired. Each video lottery terminal 101 also provides a redemption ticket in response to a request from a player, assuming that the player has a remaining credit balance. The video lottery terminal 101 in the illustrative embodiment of the invention for California applications does not dispense coins or currency and is not activated by a handle. Each video lottery terminal 101 accepts currency or other representations of value to qualify a player to participate in one or more games. Each video lottery terminal 101 allows the player to choose combinations of numbers or spots or to select an option of having the system automatically pick combinations of numbers or spots for the player. Each video lottery terminal 101 electronically displays the player's choices using a dedicated display area that is designated for that function only. Player's choices are displayed on the video display terminal 101.

Each video lottery terminal 101 records player choices and game enrollment identification on a game play ticket and may provide the game play tickets and/or redemption tickets. Each video display terminal 101 displays player information such as credit balance and game enrollment and displays in this embodiment which is designed for California applications, for verification purposes, the game results in an area separate from that which displayed the player's choices and only upon activation of the video lottery terminal by inserting a game play ticket into the video lottery terminal. In embodiments of the invention which are not constrained by California restrictions, the display for verification could be shown the same physical area as the player's choice area or, alternatively, display functions on the same display may be used. If the game play ticket is inserted into the video display terminal before completion of all games enrolled on the ticket, the game play ticket will be ejected without the video display terminal displaying any game results. At the player's option, the video lottery terminal 101 displays the current value of each prize pool and the overall estimated odds of winning a prize. In other embodiments, the game play ticket will remain in the video lottery terminal 101 and provide the player with the ability to play games only after they have been drawn by central game server 130. Each video lottery terminal 101 performs security functions necessary to maintain the integrity of the operation of the terminal 101.

Each of the video lottery terminals 101 is coupled to a central accounting server 110. The central accounting server 110 is a central computer of a type commercially available. The central accounting server is also connected to a central game server 130, and to cashier terminals 140. The central accounting server 110 is programmed to manage player account data bases which comprise the amount of money deposited by the player, any winnings or losses of the player, any credit due to the player and accounting functions which are unrelated to the play of the game. Operation of the central game server 130 is independent of the central accounting server 110.

In the illustrative embodiment of the invention shown in the drawing, the central accounting server 110 deducts and accounts for an administrative fee deducted from a player's wager. In other systems, which are not subject to requirements imposed by the state of California, it would be possible for the central accounting server to not deduct administrative fees. The central accounting server 110 stores records for each lottery game generated by the central game server 130. Each lottery game record includes the lottery draws for the game and player enrollment for each game. The central accounting server 110 also provides management, allocation, and accounting with respect to all prize pools on an individual and aggregate basis; and provides accounting and tracking of video lottery terminal activity.

A central game server 130 is a computer of a type commercially available which is programmed solely to randomly draw lottery numbers or picks on a periodic basis and independently of the central accounting server 110 and the video lottery terminals 101. If for example, a keno game type format is used, a predetermined group of numbers is randomly drawn from a field of 80 numbers in order to determine the outcome of a lottery game. This draw of numbers is, for convenience, referred to as the "CGS draw." The central game server 130 communicates a randomly generated CGS draw for each game to the central accounting server 110. The central game 130 server utilizes well known random number lottery software to generate the CGS draws for each game. Such software is commercially available and may include various security features to ensure integrity of operation.

The central game server 130 also communicates CGS draws to a scoreboard 150 via the central accounting server 110. The scoreboard 150 displays the CGS draw for each lottery game. The scoreboard 150 may be any electronic display device suitable for displaying, information and may be any one of a number of commercially available units. Although only one scoreboard 150 is shown in the block diagram, it will be apparent that more than one scoreboard display may be coupled to the system to permit viewing of the CGS draws at more than one location or from many different viewing directions. In the embodiment of the invention shown, the scoreboard 150 displays CGS draws for the last ten lottery games played. The display of each CGS draw will remain in a fixed position on the display for a predetermined period of time, typically for no less than ten seconds.

The system further includes one or more cashier terminals 140. Each cashier terminal 140 is an attendant terminal located remotely from the video lottery terminals 101. Each cashier terminal 140 communicates with the central accounting terminal 110 to verify redemption tickets and game play tickets. Cashier terminals 140 may be of a type generally known and commercially available.

Figure 3:
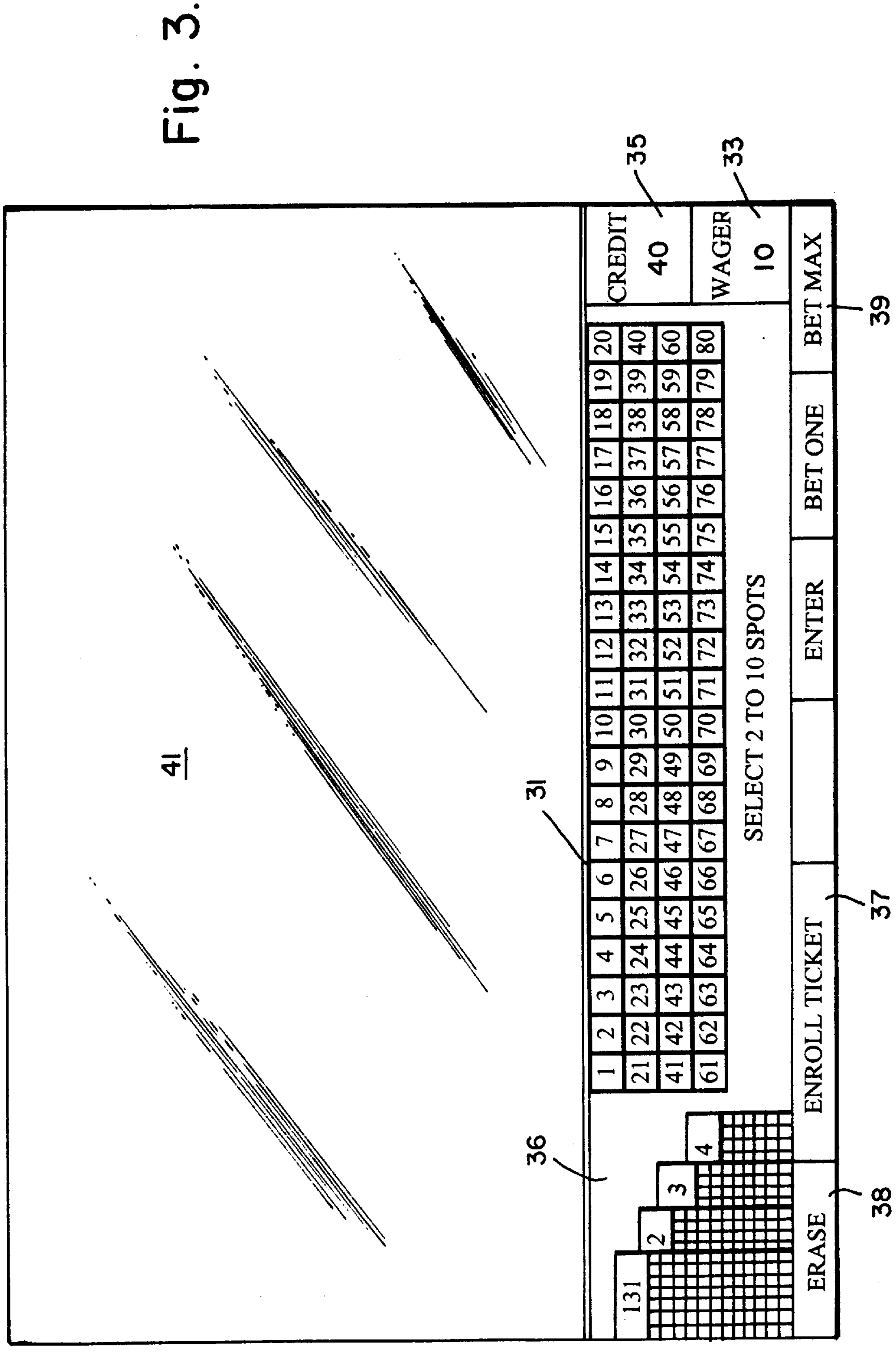
FIG. 3 is representation of a video display that would be viewed by a player of the game in accordance with the invention.

Turning now to FIG. 3, an illustrative video screen display is shown for the video lottery terminals 101. The display shown in FIG. 3 is for a game that is a keno like game. The display includes several fields. A first field 31 shows the selection field from which the player selects the spots or numbers that he/she desires to play. A second field 33 is for selection of the wager amount. A third field 35 is used to indicate the amount of credits remaining. Field 37 is used to enroll the ticket for playback of the draws. Field 39 is used to permit the player to bet a maximum amount on a draw by simply selecting that field. Field 38 allows a player to erase any entry before entering his draw. Finally, field 36 displays the games for which the player has selected draws. The remaining field 41 is utilized to provide a playback field to entertain the player when the player decides to view the simulated play of the draw. In this embodiment of the invention, the display is shared by multiple functions as the state of the terminal changes throughout different stages of play.

Figure 4:
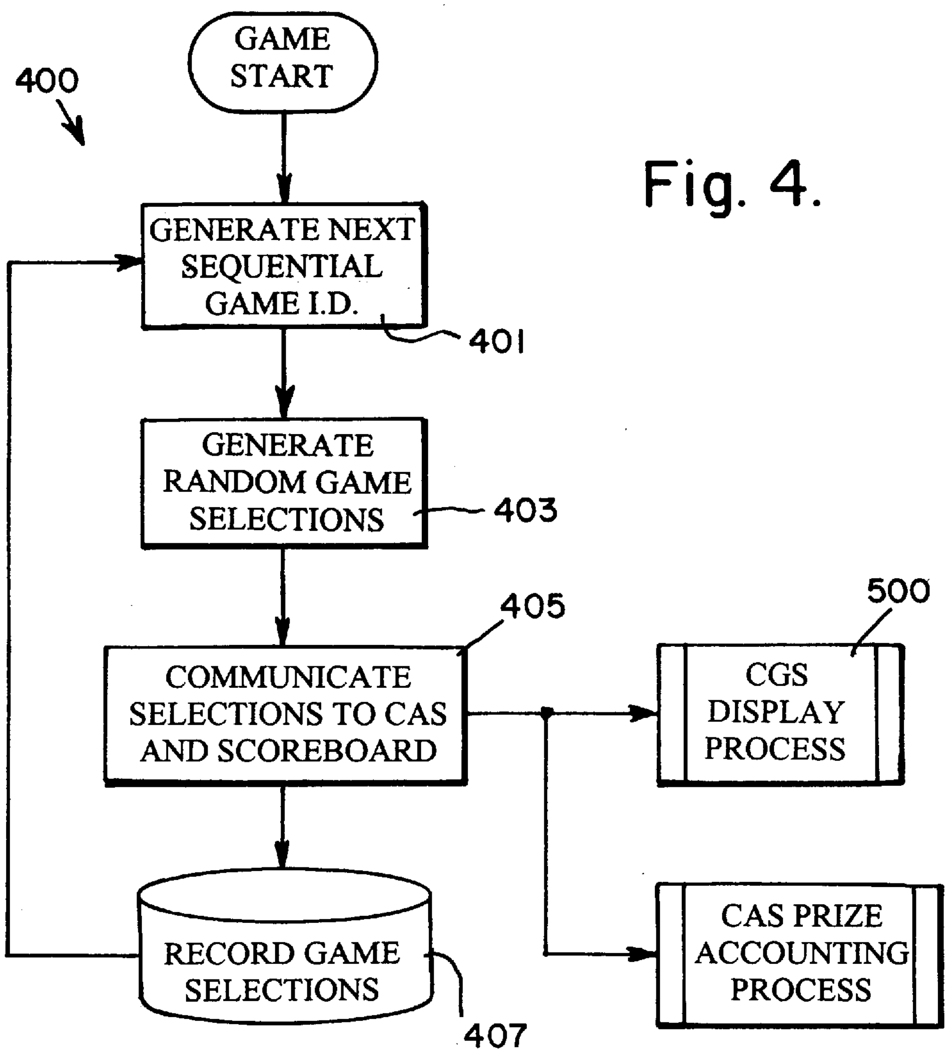
FIG. 4 is a flow diagram of a selection process in accordance with the invention.
Figure 5:
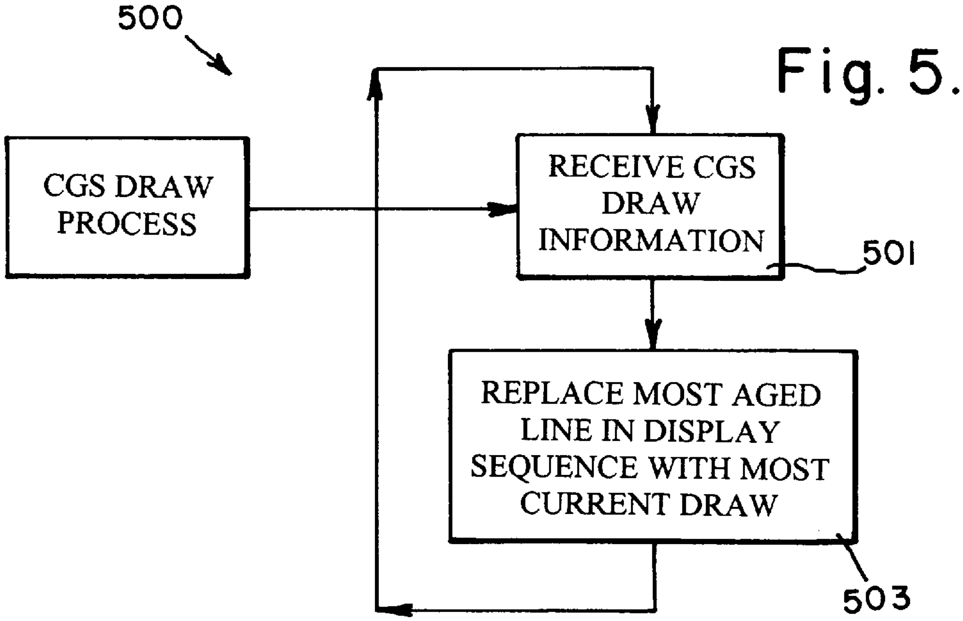
FIG. 5 is a flow diagram of a display process.

FIG. 4 illustrates in flow diagram form the central game server 130 operation. In the embodiment of the invention which is shown in FIG. 1, the central game server 130 only communicates to central accounting server 110. The central accounting server 110, in turn provides display information of CGS draws to the scoreboard and to the video lottery terminals 101. In operation, the central game server 130 generates a sequential identification number for each game in step 401. After the game identification number is generated, the central game server 130 generates the random game selections for the game in step 403. The game identification and the game selections are communicated by the central game server to the central accounting server 110 and to the scoreboard 140 in step 405. The central game server records in memory the random game selections for each game number in step 407 and then repeats the process. Operation of the central game server is independent of any other operation in the system. The games will occur periodically at a predetermined rate. Lottery game results are transmitted to the central accounting server which displays the game results on its scoreboard 150 in accordance with the CGS display process 500 of FIG. 5.

Information received from the central game server draw process as shown in FIG. 4 is received in step 501 and is used to replace the most aged line in the display sequence with the most current draw information as set forth in step 503. In this manner, the scoreboard display 140 will always display the most recent game draws. The number of games displayed is chosen such as to provide a relative excitement in the game and may vary according to the particular gaming facility requirements.

Figure 6:
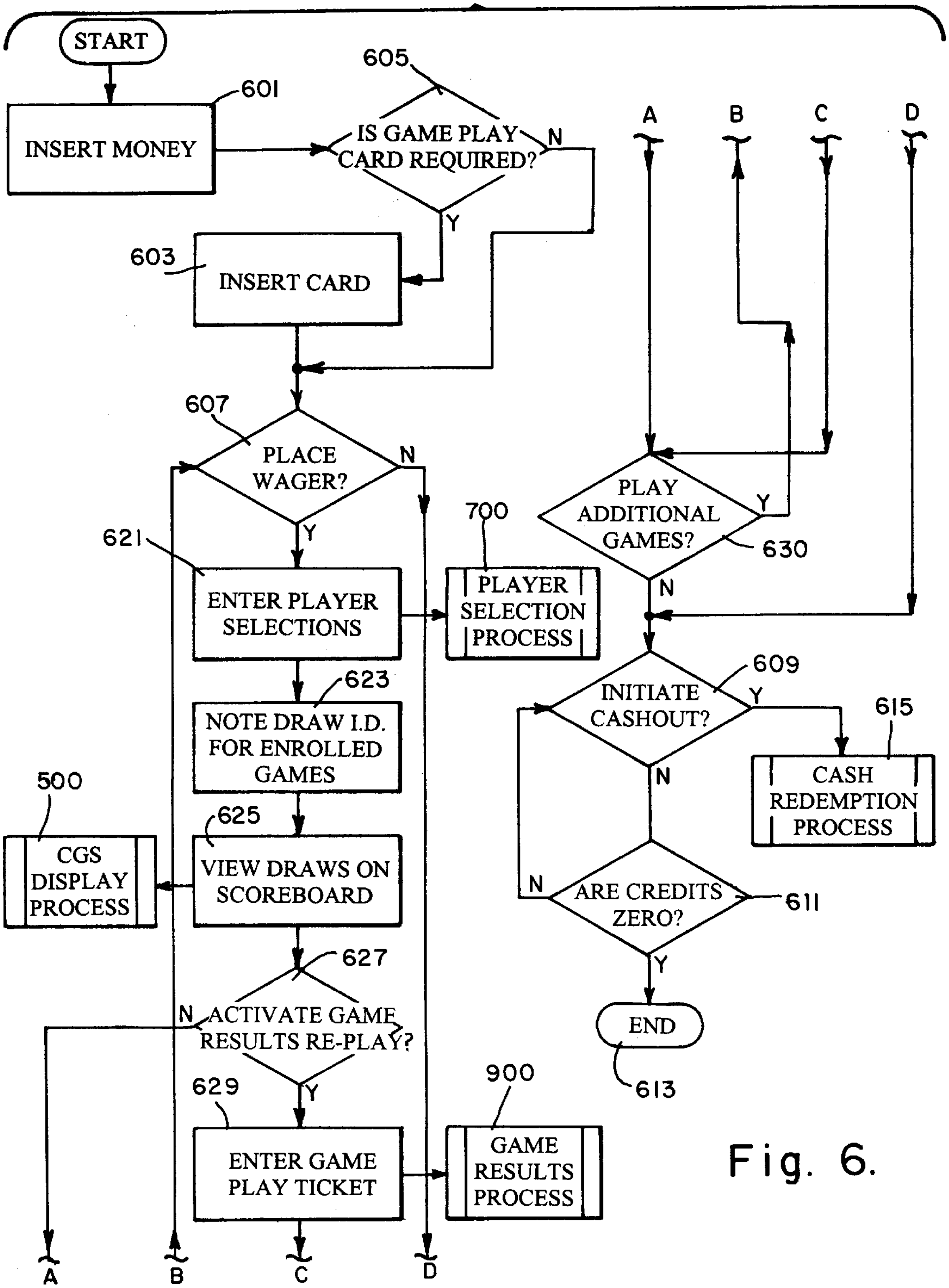
FIG. 6 is a flow diagram of the game play in accordance with the invention.

Turning now to FIG. 6, the overall game play interaction with the player selection process, the central game server process, the game result process and the cash redemption process is shown, with details of the specific processes shown in other Figures. To start play of the game, the player will either insert money as indicated at step 601 or insert a game card as indicated in step 603. If the player inserts money in step 601, the process will make a determination in step 605 as to whether or not a game card must be inserted. After that determination, the system determines in step 607 whether the player has entered a wager and the amount of the wager. If the player has not entered a wager, the system will determine whether the player is to be cashed out in step 609. If the player has not indicated a cash out, the system in step 611 determines whether or not the credits to the player account are zero or not. If the credits are zero, the play of game for this player is ended in step 613. If the credits are not zero, step 611 is repeated. If in step 611 it is determined that a cash out is to be initiated, then the process enters the cash redemption portion as explained in conjunction with FIG. 10.

Figure 7:
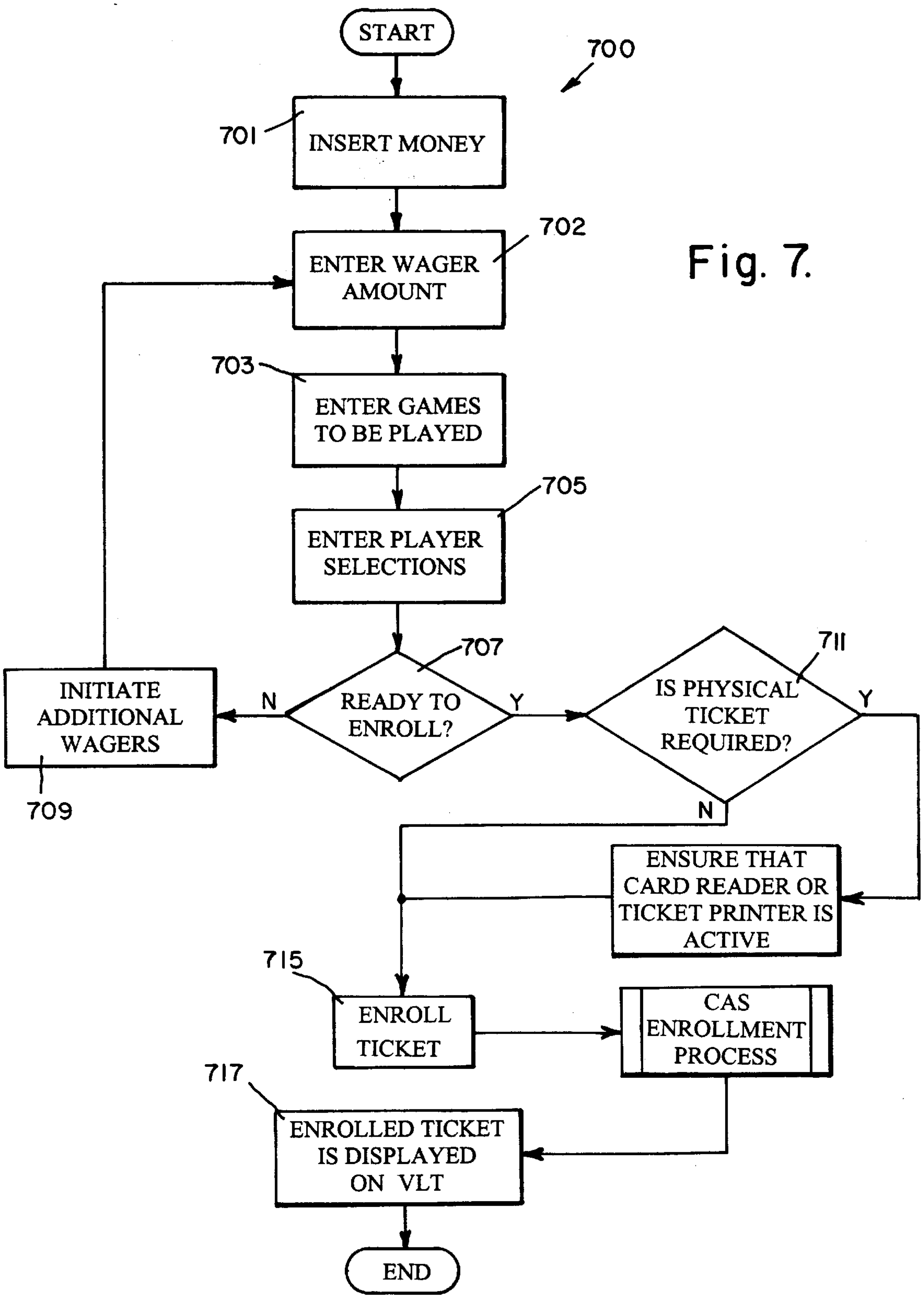
FIG. 7 is a flow diagram of the player selection process.

Returning back to the flow diagram of FIG. 6 at step 607, the system determines whether the player has placed a wager. If the player has placed a wager at step 607, the next step in the process is the entry into the game selection process or the entry of player selections as indicated at step 621. The player selection process 700 is shown in greater detail in the flow diagram of FIG. 7. The player inserts money 701 and enters an initial wager amount at step 702 followed by entry of the games to be played at step 703. Other player selections are entered in step 705 after which a determination must be made as to whether the player entries are ready to be entered into the game at step 707. If additional wagers are to be initiated the process loops back via step 709 to step 702 to enter the additional wager amounts. If at step 707 the player has indicated that his wager and selections are complete, the system determines whether a physical ticket is required at step 711. If it is determined that a physical ticket is required to, for example, meet legal requirements as in California, then step 713 determines that the card reader or ticket printer is activated. After determining that the card reader or ticket printer is active or if it is determined that no physical ticket is required, enrollment is initiated at step 715. The central accounting server process is initiated by branching to the central accounting server enrollment process program 800. After the enrollment 800 is complete, the enrollment is displayed 717 on the player's video display terminal.

Figure 8:
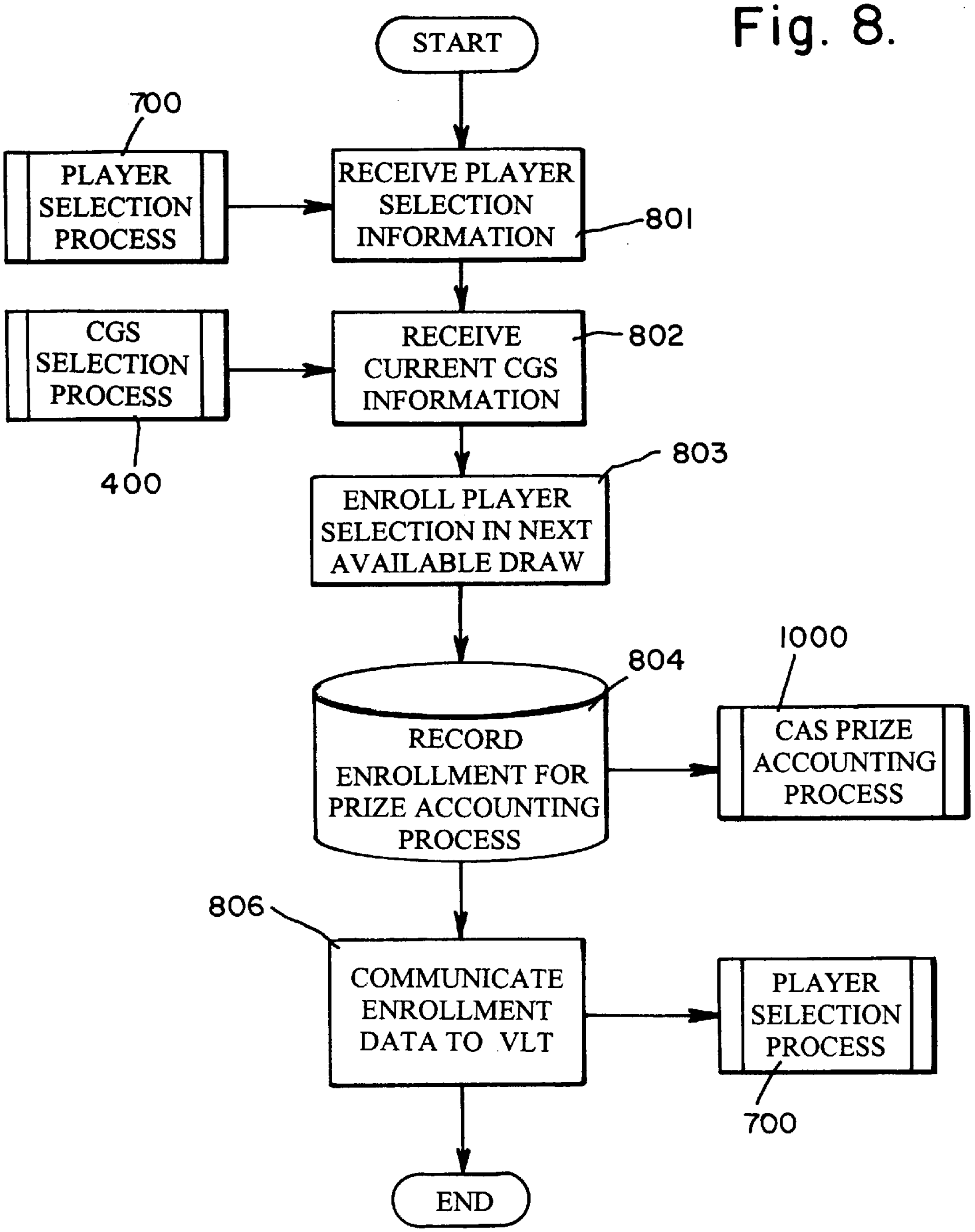
FIG. 8 is a flow diagram of an enrollment process in accordance with the invention.

Turning to FIG. 8, the enrollment process is shown in more detail. The central accounting server receives the player selection information at step 801. Information from the central game server is also received at step 802 and along with the player selection information is used to enroll the player selection in the next available draw in step 803. The enrollment information at step 804 is stored in memory for prize accounting process step which occurs at the central accounting server at step 805. In addition, the enrollment data is communicated to the video lottery terminal at step 806.

Returning to FIG. 6, after the player's selection process has been complete, the draw identification for the enrolled games is noted in step 623. The game draws are then viewed on the scoreboard at step 625 which branches to the central game server display 500. The player can at any time activate a replay of the game at step 627 by entering the play ticket as indicated at step 629. After the games result process has been completed, the player may decide to play additional games at step 630.

Figure 9:
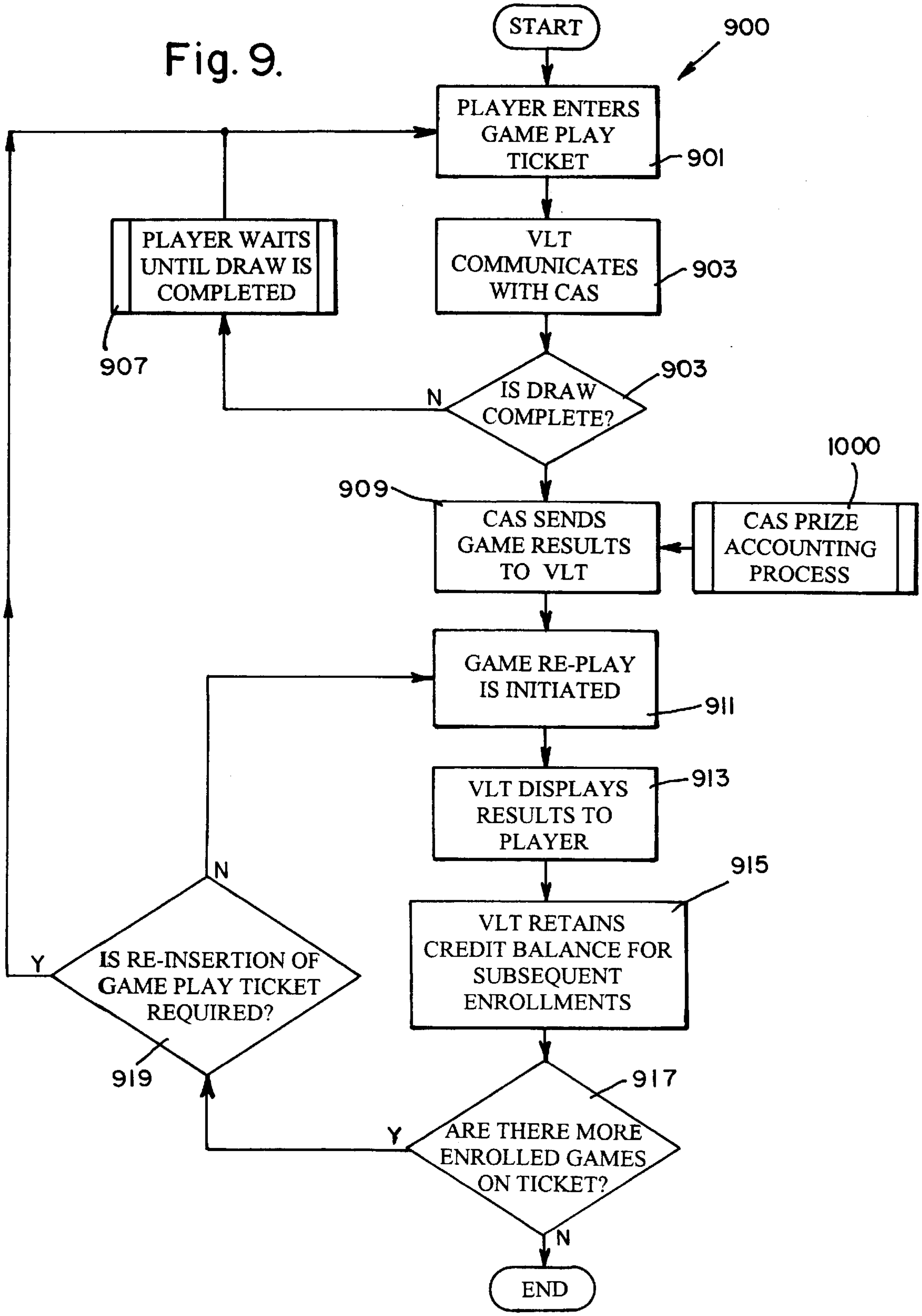
FIG. 9 is a flow diagram illustrating the game result process.

FIG. 9 illustrates the flow operation which occurs as part of the games results process 900. This portion of the process is initiated by the player entering a game ticket in step 901. The game ticket is entered into the system at the video lottery terminal 101 which in turn communicates with the central accounting server 110 in step 903 to provide the player entered information to the central accounting server 110. A determination is made in step 905 to determine whether the draw has been completed. If the draw is not complete, the player waits until the draw is completed in step 907, after which the player again enters a game play ticket. If the draw is complete, the central accounting server 110 sends the game results to the video lottery terminal 101 in step 909. The game results are provided from the central accounting server 110 prize accounting process 1000 which is described in more detail in conjunction with FIG. 10. After the game results are sent to the video lottery terminal 101, the game replay may be initiated in step 911. The video lottery terminal 101 will display the results of the game to the player in step 913. The game replay feature is one advantageous aspect of the invention. The central accounting system 110 has stored in a memory a plurality of groups of video game plays. Each group of game plays corresponds to a winning or losing draw grouping. For example, one group may correspond to lottery draws in which a specific number of matching number draws in a game have been picked in advance by the player, another group would correspond to a second specific number of matching number draws. Within each group of video game plays, several different video game plays are stored. When a player replays the outcome of his lottery draw for a game, the central accounting server 110 identifies the specific group of video game plays to be chosen according to the player's draw outcome for a game. The central accounting server 110 then selects one of the video game plays from the selected group and downloads the selected game play to the player's video lottery terminal 101 which executes the game play.

In the illustrative embodiment, the central game server 130 will initiate a new lottery game every second. If a player decides to play the game, he/she will play either the minimum or the maximum amount. The player may then select the specific numbers for each draw or may select "quick pick" play. The quick pick choice results in a random number generator located either at the central accounting server 110 or within the terminal 101 selecting the requisite number of numbers for a draw. After the number selection is made, the player hits a "play" button area on the display.

The hitting of the play button enrolls the player in the next available lottery game which is periodically and automatically drawn by the central game server. The numbers drawn in that subsequent game by the central game server 130 are transmitted to the central accounting server 110. The players "quick pick" numbers are compared by the central accounting server 110 to the lottery draw numbers for the game. The results of that game are recorded and are transmitted back to the player terminal. The central accounting system 110 identifies a group of video game plays stored in memory which have an end result outcome determined by matching the results of the draw with the player choices and comparing the matches to an award schedule. The pay amount from the award schedule may depend upon other winning players and upon the amount of funds available in a player pool corresponding to the players draw.

The video lottery terminal 101 will retain the credit balance for the player for subsequent draw enrollments in step 915. A determination is made as to whether there are any more enrolled games on the game ticket in step 917. If there are more games then step 919 will determine whether the operation is reentered at step 901 or at step 911 depending on whether the system requires reinsertion of the game play ticket.

Figure 10:
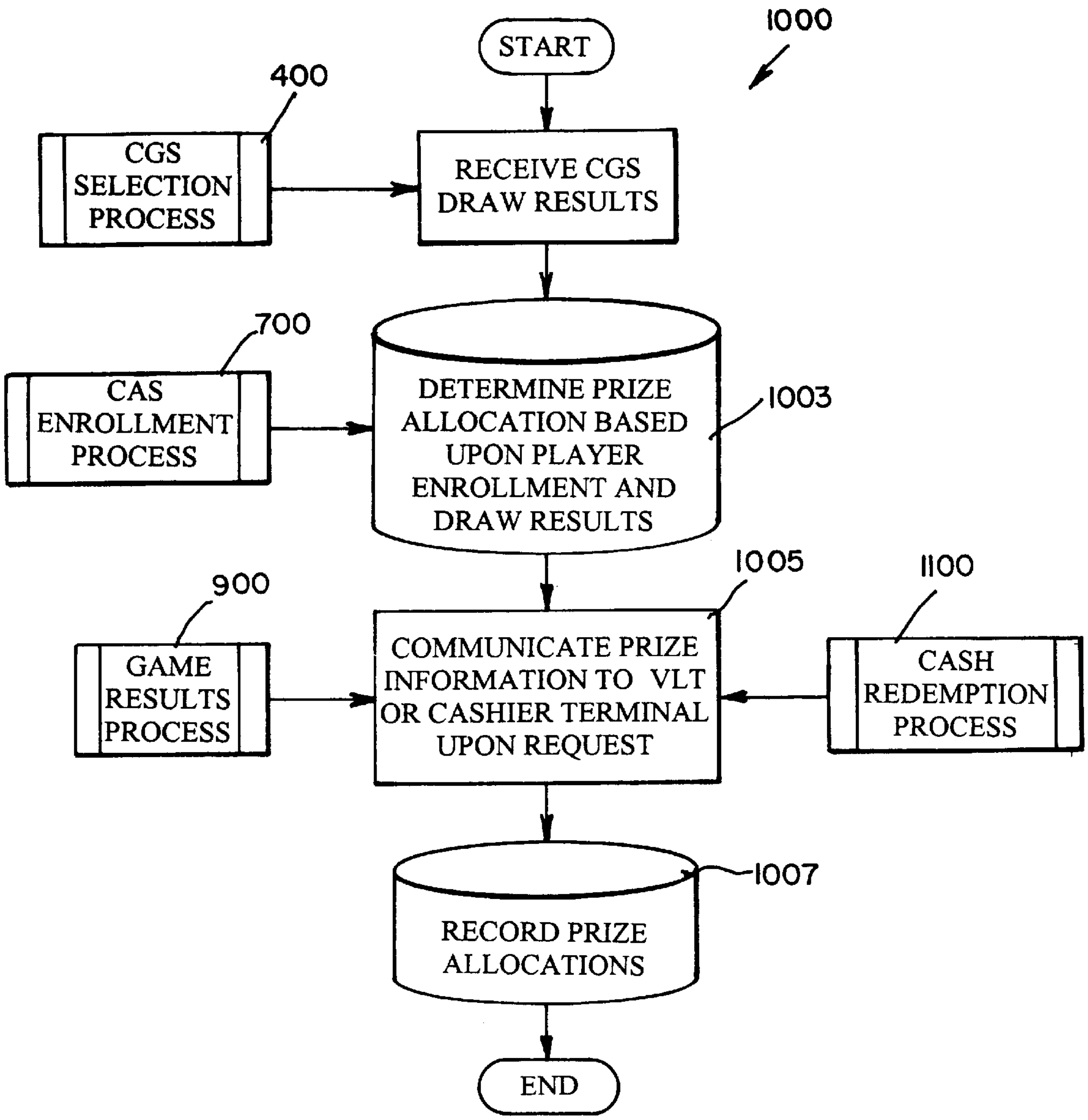
FIG. 10 is a flow diagram illustrating the prize accounting process.

FIG. 10 illustrates the central accounting server 110 operation and indicates the interaction of the central game server 130 selection process 400 with the games result process 900, the central accounting server enrollment process 700 and a cash redemption process 1100 with the CAS prize accounting process 1000. As indicated in step 1001, the lottery draw results are periodically received from the central game server selection process 400. The central accounting server determines the prize allocation based upon the draw results and the enrollment process 700 as indicated in step 1003. After the prize allocation is determined, the prize information is communicated to the video lottery terminals 101 or to one or more cashier terminals upon request as part of the cash redemption process 1100 and is also communicated to video lottery terminals 101 as part of the game results process 900. The prize allocations are recorded into memory of the central accounting server in step 1007.

Details of the cash redemption process are not shown in the drawing Figures. However, the principle of this process is simple and straight forward. A player requests an attendant at a cashier terminal to redeem the value from a game play ticket. The attendant will then enter the player's game play ticket. The central accounting system 110 receives the information from the game play ticket, verifies the accuracy and integrity of the information and provides payout authorization information back to the cashier.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An electronic gaming system comprising:

a plurality of player terminals for playing electronic games, each of said player terminals having a display and having data entry controls for entry of player selection information for future lottery games;

first computer programs executable for controlling and managing said terminals;

second computer programs executable independent of said first computer programs for automatically initiating a lottery draw for each new lottery game;

each of said terminals, when operated by a player, providing to said first computer programs the player selection information entered by the player, said first computer programs providing game identification information to the terminal being operated by the player, said terminal being operated by the player issuing a game play ticket including said player selection information and said game identification information; and said terminal being operable, after the lottery draw for the game identified on said ticket and upon said ticket being entered at said terminal, for displaying a replay of the draw awarding a predetermined prize for the identified game.

2. An electronic gaming system according to claim 1, wherein:

said terminal communicates with said first computer programs, said first computer programs matching the lottery draw for said identified game with said player selection information for receiving said replay.

3. An electronic gaming system according to claim 1, wherein:

said first computer programs match said lottery draw and said player selection information against a prize schedule for awarding said predetermined prize.

4. An electronic gaming system according to claim 1, wherein:

said first computer programs randomly select said replay from a group of game plays associated with said predetermined prize.

5. An electronic gaming system in accordance with claim 4, wherein:

said first computer programs select said group of game plays from a plurality of groups of game plays, each group of said plurality of groups of game plays having a predetermined relationship to lottery prizes.

6. An electronic gaming system according to claim 1, wherein:

at least one other terminal of said plurality of terminals being operable, after the lottery draw for the game identified in said ticket and upon said ticket being entered into said at least one other terminal, for displaying said replay.

7. An electronic gaming system according to claim 1, wherein:

each terminal of said plurality of terminals being operable, after the lottery draw for the game identified in said ticket and upon said ticket being entered into a one of said terminals, for displaying on said one of said terminals said replay.

8. An electronic gaming system in accordance with claim 7, wherein:

said terminals are operable for displaying said replay in an entertaining manner with a predetermined outcome.

9. An electronic gaming system in accordance with claim 5, wherein:

each said group of said plurality of groups of game plays corresponds to predetermined lottery game outcomes.

10. An electronic gaming system in accordance with claim 1, comprising:

a first computer for operating said first computer programs.

11. An electronic gaming system in accordance with claim 10, comprising:

a second computer for operating said second computer programs, said second computer being separate from said first computer.

12. An electronic gaming system in accordance with claim 10, wherein:

said first computer operates said second programs.

13. An electronic gaming system in accordance with claim 1, comprising:

at least one scoreboard display for displaying said lottery draw for general viewing by the players.

14. An electronic gaming system in accordance with claim 13, wherein:

said at least one scoreboard displays the lottery draws for a predetermined number of lottery games.

15. An electronic gaming system in accordance with claim 1, wherein:

said second computer programs automatically assigns a unique game identifier to each said new lottery game.

16. A method of playing a video lottery game comprising:

a participating player entering player selection information for a future lottery game at a one player terminal of a plurality of player terminals;

a central accounting server receiving said player selection information from said one terminal and game identification information from a central game server and enrolling the player in the future lottery game;

said central accounting server providing to said one player terminal said game identification information concerning the future lottery game in which the player is enrolled;

said one terminal issuing a game play ticket including said player selection information and said game identification information;

said central game server performing a lottery draw for said lottery game and providing the draw information to said central accounting server; and entering said ticket at any terminal of said plurality of game terminals and, provided said lottery draw had been completed, said any terminal receiving a game replay from said central accounting server corresponding to the player's outcome for the enrolled game and displaying said game replay.

17. A method according to claim 16, wherein:

in the ticket entering step, said any terminal rejecting said ticket without displaying said game replay if said lottery draw had not been completed.

18. A method according to claim 16, wherein:

in the ticket entering step, said any one terminal communicates with said central accounting server, said central accounting server matching said lottery draw with said player selection information.

19. A method according to claim 16, wherein:

in the ticket entering step, said central accounting server matching said lottery draw and said player selection information against a prize schedule for awarding a predetermined prize.

20. A method of playing a video lottery game according to claim 16, wherein:

in the ticket entering step, said game replay awards a predetermined prize for said enrolled game.

21. A method according to claim 20, wherein:

in the ticket entering step, said game replay is randomly selected from a group of game plays awarding said predetermined prize.

22. A method according to claim 21, wherein:

in the ticket entering step, said group of game plays is selected from a plurality of groups of game plays, each group of said plurality of groups of game plays having a predetermined relationship to lottery prizes.

* * * * *

UNITED STATES PATENT AND TRADEMARK OFFICE
CERTIFICATE OF CORRECTION

PATENT NO. : 6,168,521 B1
DATED : January 2, 2001
INVENTOR(S) : Robert A. Luciano et al.

It is certified that error appears in the above-identified patent and that said Letters Patent is hereby corrected as shown below:

<u>Title page,</u>
In the "Inventors" section, the following inventor should be added:
-- Howard Dickstein, Sacramento, CA (US) --.

<u>Column 2,</u>
Line 52, the comma should be deleted after "a".

<u>Column 6,</u>
Line 19, the comma should be deleted after "displaying".

Signed and Sealed this

Twenty-seventh Day of November, 2001

*Attest:*

Nicholas P. Godici

NICHOLAS P. GODICI

*Attesting Officer* *Acting Director of the United States Patent and Trademark Office*